(12) United States Patent
Bringert et al.

(10) Patent No.: US 8,706,505 B1
(45) Date of Patent: *Apr. 22, 2014

(54) VOICE APPLICATION FINDING AND USER INVOKING APPLICATIONS RELATED TO A SINGLE ENTITY

(71) Applicant: Google Inc., Mountian View, CA (US)

(72) Inventors: Bjorn Erik Bringert, Bath (GB); Pawel Pietryka, London (GB); Peter John Hodgson, London (GB); Simon Tickner, Whitstable (GB); Henrique Penha, San Francisco, CA (US); Richard Zarek Cohen, London (GB); Luca Zanolin, London (GB); Marcus Foster, West Malling (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/944,229

(22) Filed: Jul. 17, 2013

Related U.S. Application Data

(63) Continuation of application No. 13/631,282, filed on Sep. 28, 2012, now Pat. No. 8,515,766.

(60) Provisional application No. 61/541,863, filed on Sep. 30, 2011.

(51) Int. Cl.
*G10L 15/00* (2013.01)

(52) U.S. Cl.
USPC .......................................................... 704/275

(58) Field of Classification Search
USPC .......................................................... 704/275
See application file for complete search history.

(56) References Cited

U.S. PATENT DOCUMENTS

| | | | |
|---|---|---|---|
| 6,208,972 B1 | 3/2001 | Grant et al. |
| 6,377,927 B1 | 4/2002 | Loghmani et al. |
| 6,859,776 B1 | 2/2005 | Cohen et al. |
| 6,941,273 B1 | 9/2005 | Loghmani et al. |
| 7,720,203 B2 | 5/2010 | Bushey et al. |
| 7,725,322 B2 | 5/2010 | Kwak et al. |
| 7,885,963 B2 | 2/2011 | Sanders |
| 7,966,176 B2 | 6/2011 | Bushey et al. |
| 7,996,228 B2 | 8/2011 | Miller et al. |
| 8,103,510 B2 | 1/2012 | Sato |
| 8,175,885 B2 | 5/2012 | Sureka et al. |
| 8,200,847 B2 | 6/2012 | Lebeau et al. |
| 8,332,224 B2 | 12/2012 | Di Cristo et al. |
| 8,515,766 B1 | 8/2013 | Bringert et al. |
| 2008/0154611 A1 | 6/2008 | Evermann et al. |
| 2008/0154612 A1 | 6/2008 | Evermann et al. |
| 2009/0117885 A1 | 5/2009 | Roth |

*Primary Examiner* — Susan McFadden

(74) *Attorney, Agent, or Firm* — McDonnell Boehnen Hulbert & Berghoff LLP

(57) ABSTRACT

A computing device is configured to initiate actions in response to speech input that includes a name or other indication of an entity, in a first spoken utterance, followed by an action, in a second spoken utterance. The computing device receives the first spoken utterance, identifies an entity based on the first spoke utterance, and indicates a plurality of available actions based on the identified entity. The computing device then receives the second spoken utterance and identifies a selection of at least one of the available actions based on the second spoken utterance. The computing device then initiates the at least one selected action.

20 Claims, 3 Drawing Sheets

VOICE APPLICATION FINDING AND USER INVOKING APPLICATIONS RELATED TO A SINGLE ENTITY

CROSS-REFERENCE TO RELATED APPLICATIONS

This patent application is a continuation of U.S. application Ser. No. 13/631,282, filed on Sep. 28, 2012, now U.S. Pat. No. 8,515,766, which claims priority to U.S. Provisional Application No. 61/541,863, filed on Sep. 30, 2011, the contents of which applications are entirely incorporated herein by reference, as if fully set forth in this application.

BACKGROUND

Unless otherwise indicated herein, the materials described in this section are not prior art to the claims in this application and are not admitted to be prior art by inclusion in this section.

Computing devices, such as mobile devices, are increasingly using speech recognition in order to receive and act in response to spoken input from a user. Voice interfaces on mobile devices are often structured as a set of actions that the user can take, to which additional input such as places, contact names, times or search queries can be given. To use such a voice interface, a user may provide speech input that identifies an action followed by an object of the action.

SUMMARY

In a first aspect, a method for a computing device is provided. The computing device receives a first spoken utterance. The computing device obtains first text based upon speech recognition performed upon the first spoken utterance. The computing device identifies an entity based on the first text. The computing device indicates a plurality of available actions based on an identified entity. After indicating the plurality of available actions, the computing device receives a second spoken utterance. The computing device obtains second text based upon speech recognition performed upon the second spoken utterance. The computing device identifies a selection of at least one action from among the plurality of available actions based on the second text. The computing device initiates the at least one selected action.

In a second aspect, a computer readable medium having stored instructions is provided. The instructions are executable by at least one processor to cause a computing device to perform functions. The functions include: receiving a first spoken utterance; obtaining first text based upon speech recognition performed upon the first spoken utterance; identifying an entity based on the first text; indicating a plurality of available actions based on the identified entity; after indicating the plurality of available actions, receiving a second spoken utterance; obtaining second text based upon speech recognition performed upon the second spoken utterance; identifying a selection of at least one of the available actions based on the second text; and initiating the at least one selected action.

In a third aspect, a computing device is provided. The computing device includes at least one processor, data storage, and a plurality of instructions stored in the data storage and executable by the at least one processor to cause the computing device to perform functions. The functions include: receiving a first spoken utterance; obtaining first text based upon speech recognition performed upon the first spoken utterance; identifying an entity based on the first text; indicating a plurality of available actions based on the identified entity; after indicating the plurality of available actions, receiving a second spoken utterance; obtaining second text based upon speech recognition performed upon the second spoken utterance; identifying a selection of at least one of the available actions based on the second text; and initiating the at least one selected action.

DETAILED DESCRIPTION

Figure 1:
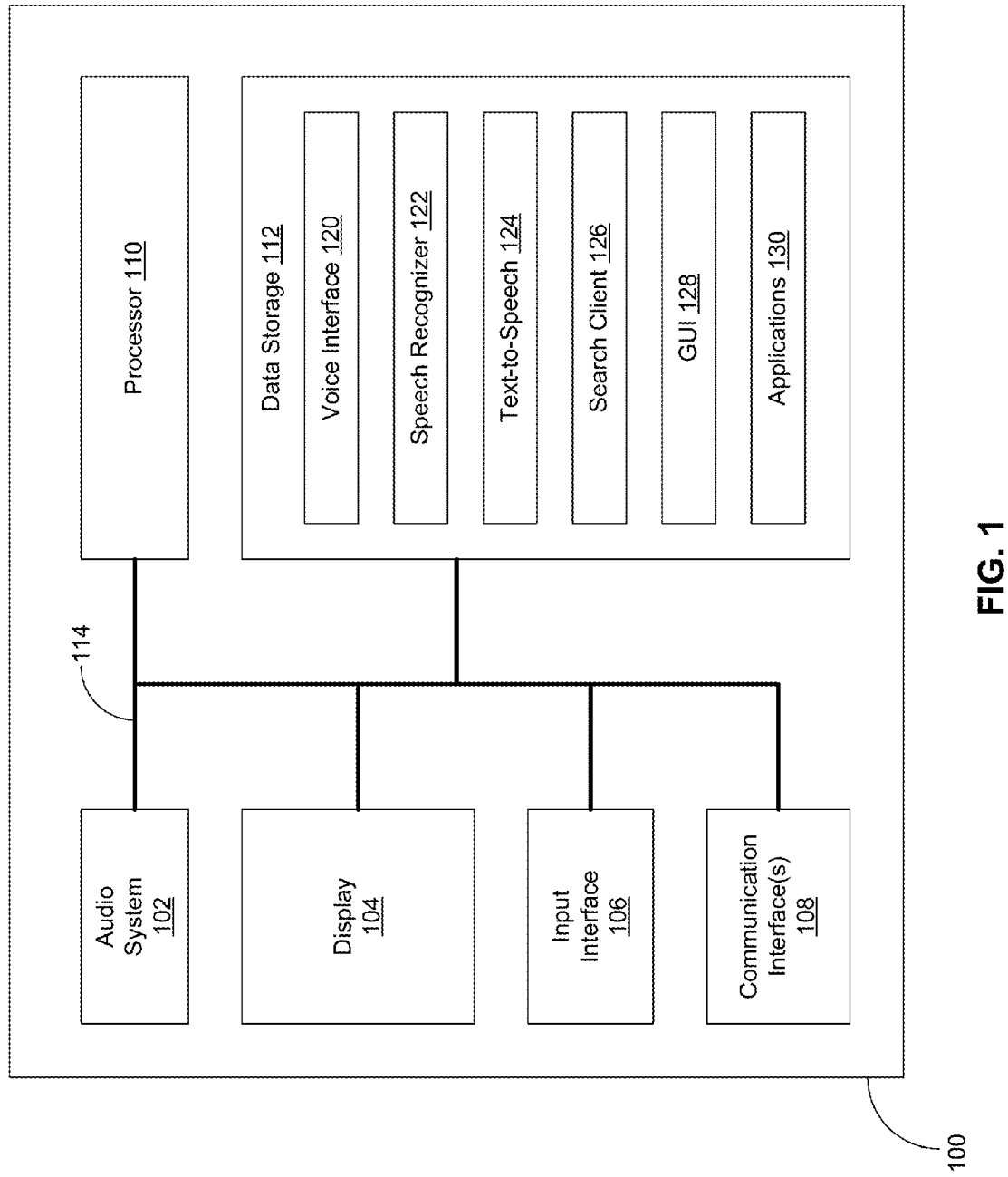
FIG. 1 is block diagram of a computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

As voice interfaces become more powerful, the number of different actions that a given voice interface supports may increase to the point that some users may experience difficulty remembering what actions are available, what the different actions do, when the different actions apply, or which voice commands invoke which actions. For example, a voice interface might support the following voice commands: "map of <place>", "directions to <place>", and "navigate to <place>". These commands relate to similar concepts, but they result in different actions. In particular, "directions to <place>" may cause the computing device to display a static list of turn-by-turn directions to the <place>, whereas "navigate to <place>" may cause the computing device to provide turn-by-turn directions in real time when the computing device is in motion (e.g., in a vehicle). Some users may find it difficult to remember which voice command does what.

In order to address these difficulties, a voice interface may be structured to receive a spoken utterance that identifies an entity, such as a person or place, and then indicate to the user what actions are available based on the identified entity. The indication could be visual (e.g., a textual listing of the available applications) and/or audible (e.g., the computing device may use a text-to-speech engine to describe the available applications). The user may then select one of the available actions, for example, by providing further speech input or by manual interaction with the computing device. The computing device may then initiate the selected action.

In this way, the computing device may indicate only those actions that apply to the entity that is identified in the user's spoken utterance. For example, if the entity is a person, the indicated actions may include only person-related actions. Such person-related actions may correspond to one or more applications for contacting the person (e.g., e-mail, text, or voice dialing), one or more social networking applications, one or more applications for managing contact lists, etc. The indicated actions may be further narrowed based on details of the identified person. For example, if the user has a telephone number for the identified person but does not have an e-mail address for the identified person, then the indicated actions may include a voice dialing application but omit an e-mail application. If the entity is a place, then the indicated actions may include only place-related actions. Such place-related actions may correspond to, for example, a mapping application, a direction application, and a navigation application. The indicated actions may further include a brief description of each application in order to help the user remember which application does what.

The computing device may further limit or adjust the indicated actions based on additional contextual information. As one example, the user's spoken utterance may provide information about what kind of action is desired in addition to identifying an entity. Thus, if the user's spoken utterance is recognized as "Message to Peter," then "Peter" may be identified as the entity and "Message to" may be identified as an additional criterion for determining relevant actions. In response, the indicated actions would only include messaging applications and, potentially, only those messaging applications that correspond to the contact information that the user has for Peter. As another example, if the identified entity is a place and the computing device determines that it is moving in a manner that is consistent with traveling in a vehicle, then the indicated actions may include a navigation application that provides directions in real time but omit an application that provides static directions. To identify a person, the user's spoken utterance may include the name of the person, such as "Bob Smith," or a description of the person, such as "stock broker," that can be used to identify a specific person in the user's contacts. Similarly, to identify a place, the user's spoken utterance may include the name of the place, such as "White House," or the address of the place, such as "1600 Pennsylvania Avenue." Alternatively, the user's spoken utterance may provide a description of a person or place that may result in a search query. For example, if the user says "the nearest gas station," a search query may be used to determine the location of the nearest gas station. The location of the nearest gas station that is determined from the search would then be identified as the entity. Next, the computing device would indicate actions that are relevant to the identified entity. For a gas station, the indicated actions may include, for example, a voice dialing application to call the gas station and a navigation application to help the user navigate to the gas station.

2. Example Computing Device

FIG. 1 is a block diagram of an example computing device 100. Computing device 100 could be a mobile device, such as a laptop computer, tablet computer, handheld computer, or smartphone. Alternatively, computing device 100 could be a fixed-location device, such as a desktop computer. In this example, computing device 100 is a speech-enabled device. Thus, computing device 100 may include an audio system 102 that is configured to receive audio from a user (e.g., through a microphone) and to convey audio to the user (e.g., through a speaker). The received audio could include speech input from the user. The conveyed audio could include speech prompts to the user.

Computing device 100 may also include a display 104 for displaying visual information to the user. The visual information could include, for example, text, speech, graphics, and/or video. Display 104 may be associated with an input interface 106 for receiving physical input from the user. For example, input interface 106 may include a touch-sensitive surface, a keypad, or other controls that the user may manipulate by touch (e.g., using a finger or stylus) to provide input to computing device 100. In one example, input interface 106 includes a touch-sensitive surface that overlays display 104.

Computing device 100 may also include one or more communication interface(s) 108 for communicating with external devices, such as a network speech recognizer. Communication interface(s) 108 may include one or more wireless interfaces for communicating with external devices through one or more wireless networks. Such wireless networks may include, for example, 3G wireless networks (e.g., using CDMA, EVDO, or GSM), 4G wireless networks (e.g., using WiMAX or LTE), or wireless local area networks (e.g., using WiFi). In other examples, communication interface(s) 108 may access a communication network using Bluetooth®, Zibee®, infrared, or other form of short-range wireless communication. Instead of or in addition to wireless communication, communication interface(s) 108 may be able to access a communication network using one or more wireline interfaces (e.g., Ethernet). The network communications supported by communication interface(s) 108 could include, for example, packet-based communications through the Internet or other packet-switched network.

The functioning of computing device 100 may be controlled by one or more processors, exemplified in FIG. 1 by processor 110. More particularly, the one or more processors may execute instructions stored in a non-transitory computer readable medium to cause computing device 100 to perform functions. In this regard, FIG. 1 shows processor 110 coupled to data storage 112 through a bus 114. Processor 110 may also be coupled to audio system 102, display 104, input interface 106, and communication interface(s) 108 through bus 114.

Data storage 112 may include, for example, random access memory (RAM), read-only memory (ROM), flash memory, cache memory, or other non-transitory computer readable media. Data storage 112 may store data as well as instructions that are executable by processor 110.

In one example, the instructions stored in data storage 112 include instructions that, when executed by processor 110, provide the functions of a voice interface 120, a speech recognizer 122, a text-to-speech (TTS) engine 124, a search client 126, a graphical user interface (GUI) 128, and applications 130. The voice interface 120 may be configured to invoke speech recognizer 122 and TTS 124 in order to interact with a user through speech. For example, voice interface 120 may invoke speech recognizer 122 in order to recognize spoken utterances from the user. In particular, speech recognizer 122 may receive a user's spoken utterance through audio system 102 and provide speech recognition results for the utterance to voice interface 120. Voice interface 120 may then identify various items of information in the speech recognition results, such as one or more entities, actions, voice commands, or queries. Depending on the information that voice interface 120 identifies in the speech recognition results, voice interface 120 may invoke TTS 124 to provide synthetic speech to the user through audio system 102. The synthetic speech provided by TTS 124 may, for example, indicate available actions, provide information requested by the user, or prompt the user to provide additional input.

Alternatively or additionally, voice interface 120 may invoke GUI 128, for example, to visually display available actions, provide information requested by the user, or to prompt the user to provide additional input. In this regard, GUI 128 may be configured to use display 104 to visually display text, graphics, video or other visual media. GUI 128 may also be configured to receive input through input interface 106, for example, when the user selects an item displayed on display 104 using a touch screen component of input interface 106.

In some cases, voice interface 120 may identify a query in the speech recognition results provided by speech recognizer 122. In response, voice interface 120 may invoke search client 126, which may communicate with one or more network servers (e.g., through communication interface 108) to obtain search results based on the identified query. Voice interface 120 may then provide information to the user based on the search results, for example, using TTS 124 and/or GUI 128.

As further described herein, voice interface 120 may determine a list of available actions based on an entity that voice interface 120 identifies in speech recognition results provided by speech recognizer 122 or based on search results obtained by search client 126. Voice interface 120 may indicate the available actions to the user using TTS 124 and/or GUI 128. The user may then select one of the available actions, for example, by providing speech input (which input may be provided to voice interface 120 by speech recognizer 122) or by manually interacting with input interface 106 (which input may be provided to voice interface 120 by GUI 128). In response to the action selected by the user, voice interface 120 may invoke one or more of applications 130. Applications 130 may include applications for e-mail, text messaging, social networking, voice dialing, maps, directions, navigation, games, music, etc.

Although FIG. 1 shows voice interface 120, speech recognizer 122, TTS 124, search client 126, GUI 128, and applications 130 as being implemented through software, some or all of these functions could be implemented as hardware and/or firmware. It is also to be understood that the division of functions among modules 120-130 shown in FIG. 1 and described above is only one example; the functions of modules 120-130 could be combined or divided in other ways.

Further, it is to be understood that at least some of the functions described above for modules 120-130 could be performed outside of computing device 100, for example by one or more network servers in communication with computing device through communication interface 108. As one example, the identifications of entities, queries, selections, and other information could be made by voice interface 120 as described above or could be made by one or more network servers in communication with voice interface 120 through communication interface 108. As another example, speech recognition could be performed by speech recognizer 122 and/or by one or more network servers in communication with computing device 100 through communication interface 108. Similarly, synthetic speech generation could be performed by TTS 124 and/or by one or more network servers in communication with computing device 100 through communication interface 108.

3. Example Methods

Figure 2:
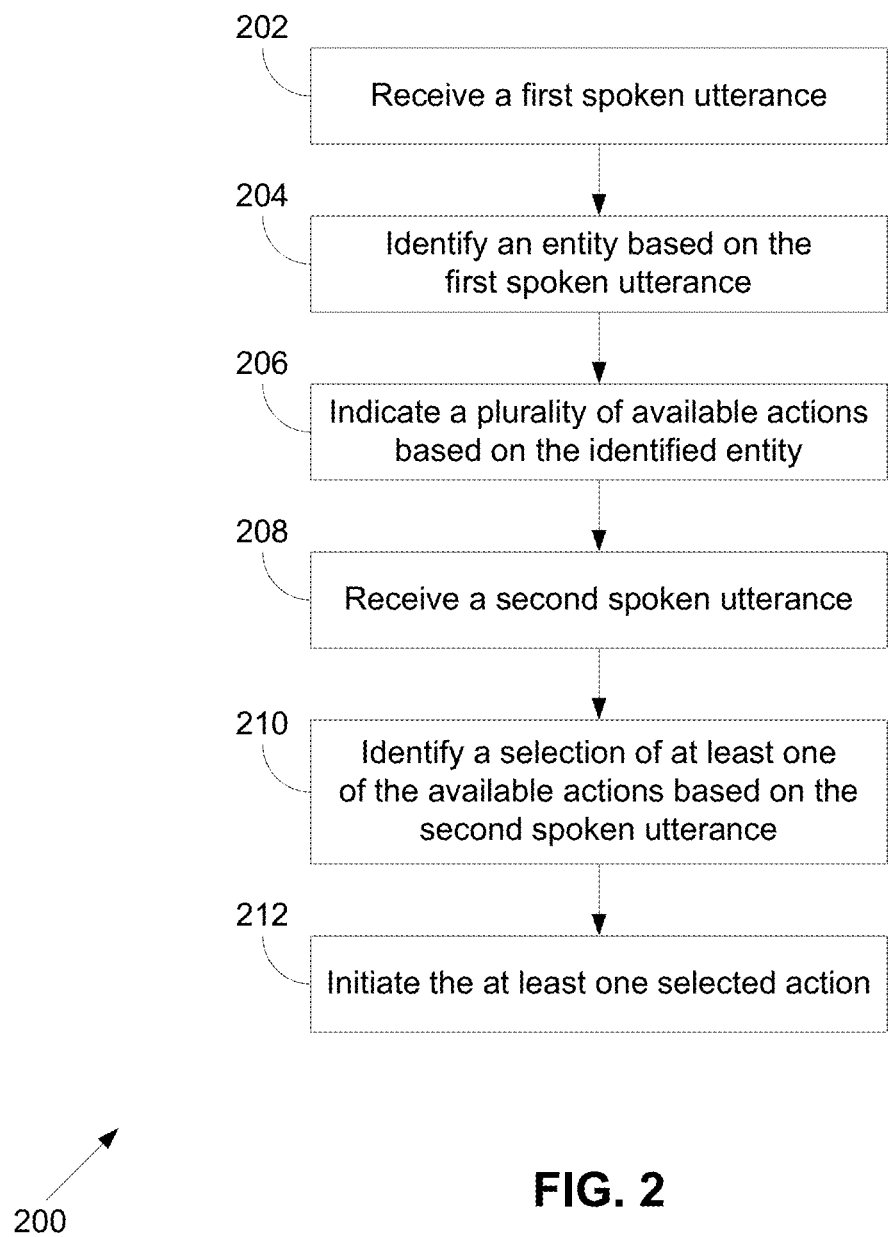
FIG. 2 is a flow chart of a method, in accordance with an example embodiment.

FIG. 2 is a flow chart illustrating an example method 200. For purposes of illustration, method 200 is explained with reference to the computing device 100 shown in FIG. 1. It is to be understood, however, that other types of computing devices could be used.

In this example, method 200 includes the computing device receiving a first spoken utterance, as indicated by block 202. The computing device may identify an entity based on the first spoken utterance, as indicated by block 204. This may be accomplished by the computing device obtaining first text based upon speech recognition performed upon the first spoken utterance and identifying the entity based on the first text. The speech recognition could be performed at the computing device. For example, a user's speech may be captured through audio system 102 and passed to speech recognizer 122 for recognition. Speech recognizer 122 may then generate a recognition result for the first spoken utterance and provide the recognition result to voice interface 120. Alternatively or additionally, the speech recognition could be performed by a network-based speech recognizer with which the computing device is in communication. For example, the computing device could transmit data representative of the first spoken utterance to a server that functions as a speech recognizer and receive the first text as a recognition result from the server.

The identified entity could be, for example, a person or a place. In some cases, voice interface 120 may be able to identify the entity by identifying a name of the entity (person or place) in the first text, e.g., the recognition results received from speech recognizer 122 and/or from a network-based speech recognizer. In other cases, however, voice interface 120 may identify in the recognition results only a general description of an entity or may identify a query that may be used to identify an entity. In such cases, voice interface 120 may do a database lookup (e.g., looking up data stored in data storage 112), invoke search client 126, invoke one of applications 130, or perform other actions to try to identify an entity based on the general description or query provided by the user.

Once the entity has been identified, the computing device may indicate a plurality of available actions based on the identified entity, as indicated by block 206. The actions could, for example, correspond to a subset of applications 130. In some examples, voice interface 120 may indicate the available actions by using TTS 124 to describe the available actions in a spoken form. Alternatively or additionally, voice interface may use GUI 128 to display the names and/or icons of applications for performing the available actions or to provide some other textual or graphical description of the available actions.

After indicating the available actions, the computing device may receive a second spoken utterance, as indicated by block 208. The computing device may then identify a selection of at least one of the available actions based on the second spoken utterance, as indicated by block 210. This may be accomplished by the computing device obtaining second text based upon speech recognition performed upon the second spoken utterance and identifying the selection based on the second text. The speech recognition could be performed at the computing device. For example, the second spoken utterance may be passed to speech recognizer 122 for recognition, and speech recognizer 122 may provide a recognition result to voice interface 120.

Voice interface 120 may then identify a selection of an action in the recognition result provided by speech recognizer 122 for the second spoken utterance. Alternatively or additionally, the speech recognition could be performed by a network-based speech recognizer with which the computing device is in communication. For example, the computing device could transmit data representative of the second spoken utterance to a server that functions as a speech recognizer and receive the second text as a recognition result from the server.

The selected action that is identified could be, for example, a name of an action, a description of an action, or other type of response that can be used to identify an action. Further, while a selected action may be identified from a user's spoken utterance, as illustrated in FIG. 2, a user may alternatively or additionally select an action in other ways, such as by a manual interaction with input interface 106.

Once the at least one action selected by the user has been identified, the computing device may initiate the at least one selected action, as indicated by block 212. To initiate a selected action, voice interface 120 could, for example, invoke one or more of applications 130. In some cases, however, the user's spoken utterance may be part of a dialog with a particular application that is already running. In such cases, voice interface 120 may indicate the user's selected action to the application that the user is already using, and that application may initiate the selected action.

Figure 3:
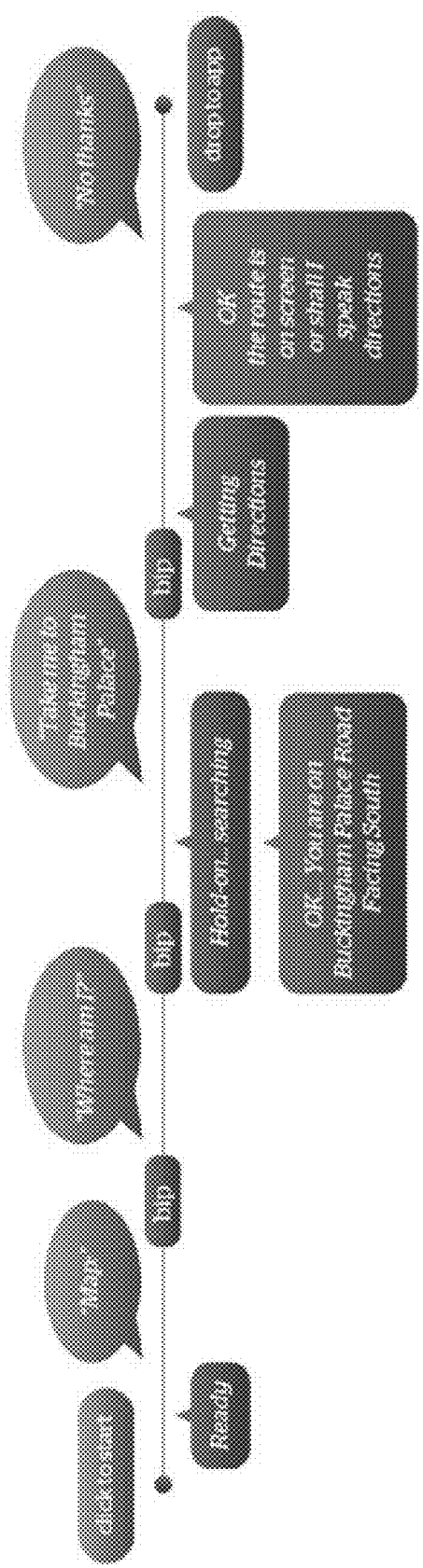
FIG. 3 is a diagram of a dialog between a user and a computing device, in accordance with an example embodiment.

FIG. 3 illustrates an example in which the user indicates an entity, and then an action, as part of an on-going dialog with the user's computing device. To begin, the user manually activates a voice interface on the computing device, which prompts the user by speaking "Ready." The user then speaks the word "Map" to invoke a mapping application on the computing device, and asks "Where am I?" The computing device uses speech to respond, stating: "Hold on . . . searching." After determining the user's location, the computing device uses speech to answer the user's query as follows: "OK . . . You are on Buckingham Palace Road facing south." The user then provides further spoken input: "Take me to Buckingham Palace."

Thus, "Buckingham Palace" would be identified as the entity (a place) in this example. Based on the entity being a place, the available actions would be place-related actions. Further, the phrase "Take me to" may be interpreted as an additional criterion for determining which actions to indicate to the user. In particular, the phrase may indicate that the user wants to receive directions rather than just see a map. Accordingly, the computing device may respond with "Getting Directions," followed by "OK, the route is on screen or shall I speak directions." The latter phrase indicates two available actions: on-screen directions and spoken directions. In this example, the user's response is "No thanks" Given the context of the user's response, it may be interpreted as a selection of the on-screen directions action. On the other hand, if the user had said "Yes," then the user's response would have been interpreted as a selection of the spoken directions action.

In this way, a voice interface can indicate to the user available actions that are relevant to an entity that is identified in the user's speech input. The available actions can be further narrowed based on other information contained in the user's speech input and/or other contextual information.

4. Non-Transitory Computer Readable Medium

Some or all of the functions described above and illustrated in FIG. 2 may be performed by a computing device (such as computing device 100 shown in FIG. 1) in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    receiving, by a computing device, a first spoken utterance;
    obtaining, by the computing device, first text based upon speech recognition performed upon the first spoken utterance;
    identifying, by the computing device, an entity based on the first text;
    indicating, by the computing device, a plurality of available actions based on the identified entity, wherein the plurality of available actions corresponds to a plurality of applications;
    receiving, by the computing device, a selection of at least one action from among the plurality of available actions; and
    invoking, by the computing device, one or more of the plurality of applications based on the at least one selected action.

2. The method of claim 1, wherein receiving, by the computing device, a selection of at least one action from among the plurality of available actions comprises:
    after indicating the plurality of available actions, receiving, by the computing device, a second spoken utterance;
    obtaining, by the computing device, second text based upon speech recognition performed upon the second spoken utterance; and
    identifying, by the computing device, the at least one selected action based on the second text.

3. The method of claim 1, wherein identifying the entity based on the first text comprises:
    determining a search query based on the first text;
    performing a search based on the search query;
    receiving at least one search result for the search; and
    identifying the entity in the at least one search result.

4. The method of claim 1, wherein indicating, by the computing device, a plurality of available actions based on the identified entity comprises:
    visually displaying textual or graphical indications of the available actions.

5. The method of claim 1, wherein indicating, by the computing device, a plurality of available actions based on the identified entity comprises:
    providing audible indications of the available actions in the form of synthesized speech.

6. The method of claim 1, further comprising:
    determining that the first text includes a selection criterion, wherein the plurality of applications satisfy the selection criterion.

7. The method of claim 1, wherein the entity is a person or a place.

8. A non-transitory computer readable medium having stored therein instructions executable by at least one processor to cause a computing device to perform functions, the functions comprising:
    receiving a first spoken utterance;
    obtaining first text based upon speech recognition performed upon the first spoken utterance;
    identifying an entity based on the first text;

indicating a plurality of available actions based on the identified entity, wherein the plurality of available actions corresponds to a plurality of applications;

receiving a selection of at least one action from among the plurality of available actions and invoking one or more of the plurality of applications based on the at least one selected action.

9. The non-transitory computer readable medium of claim 8, wherein receiving a selection of at least one action from among the plurality of available actions comprises:

after indicating the plurality of available actions, receiving a second spoken utterance;

obtaining second text based upon speech recognition performed upon the second spoken utterance; and identifying the at least one selected action based on the second text.

10. The non-transitory computer readable medium of claim 8, wherein identifying the entity based on the first text comprises:

determining a search query based on the first text;

performing a search based on the search query;

receiving at least one search result for the search; and identifying the entity in the at least one search result.

11. The non-transitory computer readable medium of claim 8, wherein indicating the plurality of applications comprises visually displaying textual or graphical indications of the applications.

12. The non-transitory computer readable medium of claim 8, wherein indicating the plurality of applications comprises providing audible indications of the applications in the form of synthesized speech.

13. The non-transitory computer readable medium of claim 8, wherein the entity is a person or a place.

14. A computing device, comprising:

at least one processor;

data storage;

a plurality of instructions stored in the data storage and executable by the at least one processor to cause the computing device to perform functions, the functions comprising:

receiving a first spoken utterance;

obtaining first text based upon speech recognition performed upon the first spoken utterance;

identifying an entity based on the first text;

indicating a plurality of available actions based on the identified entity, wherein the plurality of available actions corresponds to a plurality of applications;

receiving a selection of at least one action from among the plurality of available actions and invoking one or more of the plurality of applications based on the at least one selected action.

15. The computing device of claim 14, further comprising a display, wherein indicating a plurality of available actions based on the identified entity comprises displaying textual or graphical indications of the available actions on the display.

16. The computing device of claim 14, further comprising a text-to-speech (TTS) engine, wherein indicating a plurality of available actions based on the identified entity comprises using the TTS engine to describe the available actions in a spoken form.

17. The computing device of claim 14, wherein receiving a selection of at least one action from among the plurality of available actions comprises:

after indicating the plurality of available actions, receiving a second spoken utterance;

obtaining second text based upon speech recognition performed upon the second spoken utterance; and identifying the at least one selected action based on the second text.

18. The computing device of claim 17, further comprising a communication interface.

19. The computing device of claim 18, wherein obtaining first text based upon speech recognition performed upon the first spoken utterance comprises communicating with a network server through the communication interface.

20. The computing device of claim 18, wherein obtaining second text based upon speech recognition performed upon the second spoken utterance comprises communicating with a network server through the communication interface.

* * * * *